United States Patent
Ryon et al.

(10) Patent No.: US 11,674,446 B2
(45) Date of Patent: Jun. 13, 2023

(54) COOLING FOR SURFACE IGNITORS IN TORCH IGNITION DEVICES

(71) Applicant: Delavan Inc., West Des Moines, IA (US)

(72) Inventors: Jason Ryon, Carlisle, IA (US); Lev A. Prociw, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/460,823

(22) Filed: Aug. 30, 2021

(65) Prior Publication Data

US 2023/0061595 A1    Mar. 2, 2023

(51) Int. Cl.
| | | |
|---|---|---|
| F02C 7/264 | (2006.01) | |
| F02C 7/22 | (2006.01) | |
| F02C 7/16 | (2006.01) | |
| B33Y 80/00 | (2015.01) | |

(52) U.S. Cl.
CPC ............... *F02C 7/264* (2013.01); *F02C 7/16* (2013.01); *F02C 7/22* (2013.01); *B33Y 80/00* (2014.12); *F05D 2250/25* (2013.01); *F05D 2260/232* (2013.01); *F05D 2260/30* (2013.01); *F05D 2260/99* (2013.01)

(58) Field of Classification Search
CPC .. F02C 7/22; F02C 7/222; F02C 7/224; F02C 7/12; F02C 7/16; F23R 3/283; F23R 3/045; F23R 3/343; F23R 3/14; F23R 3/20; F23R 3/28
See application file for complete search history.

(56) References Cited

U.S. PATENT DOCUMENTS

| | | | | |
|---|---|---|---|---|
| 2,757,270 A | * | 7/1956 | Fairbanks | F23K 5/20 219/535 |
| 3,000,176 A | * | 9/1961 | Kuhrt | F02C 7/08 60/749 |
| 3,241,310 A | * | 3/1966 | Hoadley | F02C 7/08 60/269 |
| 3,354,652 A | * | 11/1967 | Novotny | F02K 9/64 60/260 |

(Continued)

FOREIGN PATENT DOCUMENTS

| | | |
|---|---|---|
| EP | 3995680 A1 | 5/2022 |
| GB | 887773 A | 1/1962 |
| WO | 9220913 A1 | 11/1992 |

OTHER PUBLICATIONS

Extended European Search Report dated Jan. 13, 2023, issued during the prosecution of European Patent Application No. EP 22192585.2.

*Primary Examiner* — Craig Kim

(74) *Attorney, Agent, or Firm* — Locke Lord LLP; Joshua L. Jones; Scott D. Wofsy

(57) ABSTRACT

A torch ignitor system includes a torch wall defining a combustion chamber therein with a flame outlet passing out of the torch wall downstream of the combustion chamber. A fuel nozzle is mounted to the torch wall to issue fuel into the combustion chamber. An ignitor is mounted to the torch wall, extending into the combustion chamber to ignite fuel issued from the fuel nozzle. A cooling passage is in thermal communication with the ignitor for cooling the ignitor with fluid passing through the cooling passage.

16 Claims, 5 Drawing Sheets

(56) References Cited

U.S. PATENT DOCUMENTS

| | | | | |
|---|---|---|---|---|
| 3,869,864 | A | * | 3/1975 | Bunn ................ F23R 3/12 60/749 |
| 3,954,389 | A | * | 5/1976 | Szetela ............. F23M 5/085 60/753 |
| 4,108,953 | A | * | 8/1978 | Rocco ............... F02M 23/12 123/549 |
| 4,112,675 | A | | 9/1978 | Pillsbury et al. |
| 4,444,254 | A | * | 4/1984 | Rathburn ........... E21B 47/117 166/138 |
| 4,491,272 | A | * | 1/1985 | Bradley ............. F02C 7/232 60/742 |
| 4,860,533 | A | | 8/1989 | Joshi |
| 4,899,538 | A | * | 2/1990 | Shekleton .......... F02K 9/64 60/753 |
| 4,949,545 | A | * | 8/1990 | Shekleton .......... F23R 3/08 60/757 |
| 5,085,040 | A | * | 2/1992 | Tilston ............. F23D 11/10 431/265 |
| 5,337,567 | A | * | 8/1994 | Loving ............. F23R 3/005 60/722 |
| 5,443,053 | A | * | 8/1995 | Johnson ............ F02M 31/16 123/557 |
| 5,513,489 | A | * | 5/1996 | Bussing ............ B05B 7/0006 60/39.38 |
| 5,528,903 | A | * | 6/1996 | Schreckling ....... F23R 3/50 60/736 |
| 5,636,511 | A | * | 6/1997 | Pfefferle ........... F23C 13/00 60/39.822 |
| 5,636,598 | A | * | 6/1997 | Moore, Jr. ......... F23N 1/107 110/162 |
| 5,737,922 | A | * | 4/1998 | Schoenman ....... F23R 3/005 415/115 |
| 5,832,718 | A | * | 11/1998 | Suttrop ............ F02C 7/224 60/39.465 |
| 6,092,590 | A | * | 7/2000 | Suttrop ............ F28D 7/026 165/169 |
| 6,647,732 | B2 | * | 11/2003 | Kuo ................. F01D 5/03 60/804 |
| 6,748,745 | B2 | * | 6/2004 | Ui ................... F23C 13/00 60/777 |
| 7,213,392 | B2 | * | 5/2007 | McMullen ........ F02K 9/64 239/127.1 |
| 7,216,488 | B2 | * | 5/2007 | Howell ............. F23R 3/283 60/776 |
| 7,316,563 | B2 | * | 1/2008 | Marshall ........... F23C 13/00 431/243 |
| 8,281,595 | B2 | * | 10/2012 | Davis, Jr. .......... F23R 3/343 60/737 |
| 9,080,772 | B2 | * | 7/2015 | Prociw ............. F23R 3/20 |
| 9,500,128 | B2 | * | 11/2016 | Thomas ............ F01D 25/30 |
| 9,556,796 | B2 | * | 1/2017 | Bleeker ............. F02C 7/25 |
| 10,006,636 | B2 | * | 6/2018 | Ginessin ........... F23D 11/107 |
| 10,094,573 | B2 | * | 10/2018 | Kim ................. F02C 7/18 |
| 10,711,699 | B2 | * | 7/2020 | Dam ................. F23R 3/343 |
| 11,209,164 | B1 | * | 12/2021 | Ryon ................ F23R 3/343 |
| 11,384,644 | B2 | * | 7/2022 | Tsuru ............... F01D 5/186 |
| 2003/0115886 | A1 | * | 6/2003 | Farmer ............. B23K 26/244 219/121.64 |
| 2004/0050056 | A1 | * | 3/2004 | Pederson .......... F23R 3/14 60/737 |
| 2004/0148923 | A1 | * | 8/2004 | Hewitt ............. F02K 9/972 60/257 |
| 2004/0168442 | A1 | | 9/2004 | Schmotolocha et al. |
| 2005/0053876 | A1 | | 3/2005 | Joos et al. |
| 2006/0286493 | A1 | * | 12/2006 | Abrahamsson ..... F22B 1/1853 431/3 |
| 2008/0016846 | A1 | * | 1/2008 | Spadaccini ....... F02K 1/64 60/267 |
| 2009/0235666 | A1 | * | 9/2009 | Tuttle .............. F23R 3/343 29/890.01 |
| 2010/0251719 | A1 | * | 10/2010 | Mancini ........... F23R 3/343 60/737 |
| 2010/0257839 | A1 | * | 10/2010 | Watkins ........... F02K 9/48 60/204 |
| 2011/0108639 | A1 | * | 5/2011 | Hicks ............... F23D 11/383 239/501 |
| 2013/0341430 | A1 | * | 12/2013 | Hall ................. F02M 61/167 239/533.2 |
| 2014/0366505 | A1 | * | 12/2014 | Prociw ............. F02C 7/266 60/39.821 |
| 2014/0366551 | A1 | * | 12/2014 | Prociw ............. F23R 3/28 60/776 |
| 2015/0000298 | A1 | * | 1/2015 | McAlister ......... F02C 7/16 60/39.12 |
| 2015/0047361 | A1 | | 2/2015 | Williams et al. |
| 2016/0102860 | A1 | * | 4/2016 | Chandler .......... B05D 3/12 60/754 |
| 2017/0234139 | A1 | * | 8/2017 | Bunker ............. F01D 5/187 60/722 |
| 2017/0284674 | A1 | * | 10/2017 | Perveiler .......... F23R 3/002 |
| 2018/0187888 | A1 | * | 7/2018 | Tangirala ......... F23R 3/02 |
| 2018/0252410 | A1 | * | 9/2018 | Zelina .............. F23R 3/002 |
| 2018/0266324 | A1 | * | 9/2018 | Lao ................. F02C 7/24 |
| 2019/0010872 | A1 | | 1/2019 | Dam et al. |
| 2019/0010873 | A1 | * | 1/2019 | Dam ................ F23R 3/343 |
| 2019/0024897 | A1 | * | 1/2019 | Prociw ............. F02C 7/222 |
| 2019/0032561 | A1 | * | 1/2019 | Stoia ............... F23R 3/42 |
| 2020/0191059 | A1 | * | 6/2020 | Ryon ............... F02C 7/24 |
| 2020/0224941 | A1 | * | 7/2020 | Cocuzza ........... F22B 1/22 |
| 2021/0215100 | A1 | * | 7/2021 | Head ................ F23R 3/045 |
| 2021/0388277 | A1 | * | 12/2021 | Konagayoshi ..... C10J 3/485 |
| 2021/0395082 | A1 | * | 12/2021 | Iwai ................ H01M 8/0606 |
| 2022/0082251 | A1 | * | 3/2022 | Comencini ....... F23D 14/24 |
| 2022/0090560 | A1 | * | 3/2022 | Lugg ............... F02K 7/18 |
| 2022/0178305 | A1 | * | 6/2022 | Snyder ............. F02K 3/10 |
| 2022/0193581 | A1 | * | 6/2022 | Jedlinski .......... B01D 35/005 |
| 2022/0195937 | A1 | * | 6/2022 | Ryon ............... F23R 3/283 |
| 2022/0195938 | A1 | * | 6/2022 | Ryon ............... F23R 3/16 |
| 2022/0195939 | A1 | * | 6/2022 | Ryon ............... F23R 3/50 |
| 2022/0221706 | A1 | * | 7/2022 | Trivedi ............ A61B 1/00078 |

\* cited by examiner

COOLING FOR SURFACE IGNITORS IN TORCH IGNITION DEVICES

BACKGROUND

1. Field

The present disclosure relates to ignition devices, and more particularly to continuous ignition devices such as used for starting and relighting combustion in gas turbine engines.

2. Description of Related Art

A small, independent torch igniter system offers many advantages for gas turbine engines. It can provide an independent heat source from the main combustor which is used to ignite, stabilize, and relight the main combustor. The isolated nature of this system allows it to be stable regardless of the conditions within the main combustor. It provides rapid relight capabilities, e.g. in case a need arises to relight an engine at altitude. In certain applications, components of the torch ignitor become very hot and may require cooling.

The conventional techniques have been considered satisfactory for their intended purpose. However, there is an ever present need for improved systems and methods for cooling components in torch ignitors. This disclosure provides a solution for this need.

SUMMARY

A torch ignitor system includes a torch wall defining a combustion chamber therein with a flame outlet passing out of the torch wall downstream of the combustion chamber. A fuel nozzle is mounted to the torch wall to issue fuel into the combustion chamber. An ignitor is mounted to the torch wall, extending into the combustion chamber to ignite fuel issued from the fuel nozzle. A cooling passage is in thermal communication with the ignitor for cooling the ignitor with fluid passing through the cooling passage.

The cooling passage can be defined between a fuel inlet and a fuel outlet. The fuel inlet can be configured to introduce fuel from a fuel source into the cooling passage. The fuel outlet can be in fluid communication with the fuel nozzle to supply fuel to the fuel nozzle for combustion in the combustion chamber. The cooling passage can include a coil section that is coiled around the ignitor along a helical path. The ignitor can extend from outside the combustion chamber, through the torch wall, and into the combustion chamber, wherein the coil section coils around a portion of the ignitor that is outside the combustion chamber.

The ignitor can be one of a plurality of ignitors each mounted to the torch wall, extending into the combustion chamber. The cooling passage can be in thermal communication with each of the ignitors in the plurality of ignitors for cooling the ignitors with fluid passing through the cooling passage. The cooling passage can include a respective coil section that is coiled along a helical path around each ignitor in the plurality of ignitors. Each ignitor can extend from outside the combustion chamber, through the torch wall, and into the combustion chamber, wherein the respective coil section coils around a respective portion of each ignitor in the plurality of ignitors that is outside the combustion chamber. The coil sections can be connected in series with one another so the cooling passage is in thermal communication with all of the ignitors in the plurality of ignitors. A respective transit portion of the cooling passage can connect coil sections. Each of the transit portions can connect the coil sections in a pattern.

The torch wall can be mounted to an engine case. The fuel nozzle and ignitor can be mounted in a portion of the torch wall outside of the engine case. A combustor can be included within the engine case. The flame outlet of the torch ignitor can be mounted in fluid communication with an interior combustion space of the combustor, wherein the combustor is spaced apart from the combustion chamber of the torch wall. There can be a compressor discharge diffuser in the engine case upstream of the torch wall and combustor. A mounting flange can extend from the torch wall and is mounted to the engine case. The torch ignitor system can be in addition to a plurality of fuel injectors extending through the engine case and operatively connected to the combustor to supply fuel and air to the combustor for combustion. The cooling passage can be additively manufactured together with the torch wall.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
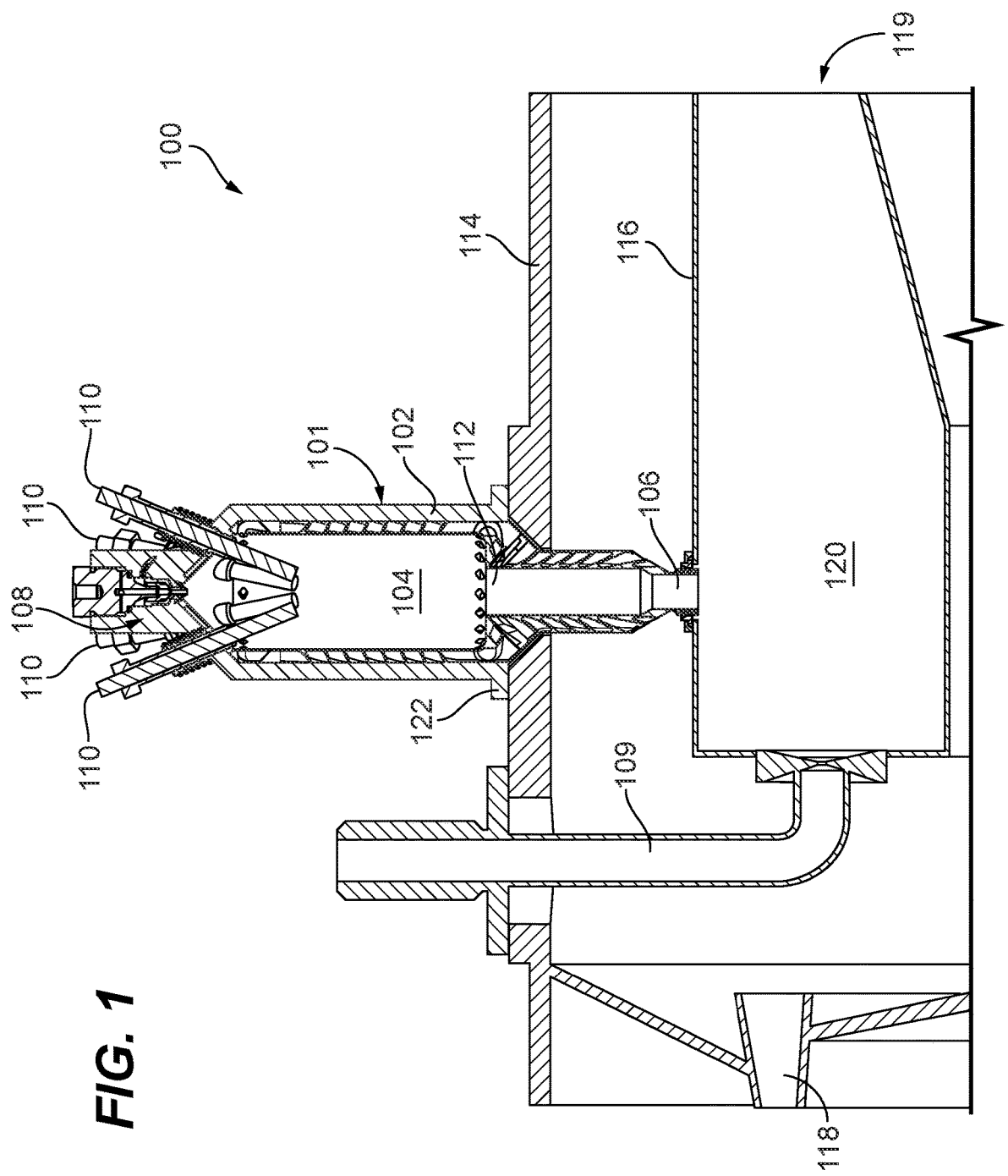
FIG. 1 is a schematic cross-sectional side elevation view of an embodiment of a system constructed in accordance with the present disclosure, showing the torch ignitor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to provide cooling for ignitors in torch ignitor systems for continuous ignition function in gas turbine engines.

The torch ignitor system 100 includes a torch ignitor 101 with a torch wall 102 defining a combustion chamber 104 therein. A flame outlet 112 passes out of the torch wall 102 downstream of the combustion chamber 104. A fuel nozzle 108 is mounted to the torch wall 102 to issue fuel into the combustion chamber 104. A plurality of ignitors 110 are mounted to the torch wall 102, positioned to ignite fuel issued from the fuel nozzle 108. The ignitors 110 extend into the combustion chamber 104 to ignite fuel issued from the fuel nozzle 108.

An outlet tube 106 is in fluid communication with the combustion chamber 104 extending downstream from the flame outlet 112. The torch wall 102 is mounted to an engine case 114. The fuel nozzle 108 and ignitors 110 are mounted in a portion of the torch wall 102 outside of the engine case 114. A combustor 116 is included within the engine case 114, e.g. for receiving compressor discharge air form an upstream compressor (not shown but the compressor discharge diffuser 118 of the compressor is labeled in FIG. 1), combusting fuel in the compressor discharge air, and issuing combustion products to a downstream turbine, the inlet 119 of which is indicated in FIG. 1. The diffuser 118 is in the engine case 114 upstream of the torch wall 102 and combustor 116. The flame outlet 112 is mounted in fluid communication, through outlet tube 106, with an interior combustion space 120 of the combustor 116. The combustor 116 is spaced apart from the combustion chamber 104 of the torch wall 102, so at start up or in the event of a flame out in the main combustion space 120, a flame from the combustion chamber 104 can issue through the outlet tube 112 and into the combustion space 120 to light or relight the combustor 116.

The torch combustion chamber 104 is mostly isolated from the main combustor 116. The narrow outlet tube 112 acts as an isolator which limits communication between the two volumes. This isolation allows the torch combustion chamber 104 to be stable while the main combustor 116 could have strong pressure oscillations which happen during ignition, blowout, acoustic instabilities, and the like. The torch combustion chamber 104 is also generally sheltered from the main combustor flow field so recirculation patterns, high velocity zones, and the like do not make their way up into the torch combustion chamber 104.

A mounting flange 122 extends from the torch wall 102 and is mounted to the engine case 114. The torch ignitor system 100 is in addition to a plurality of fuel injectors 109 extending through the engine case 114 and operatively connected to the combustor 116 to supply fuel and air to the combustor 116 for combustion, e.g. to power the gas turbine engine.

Figure 2:
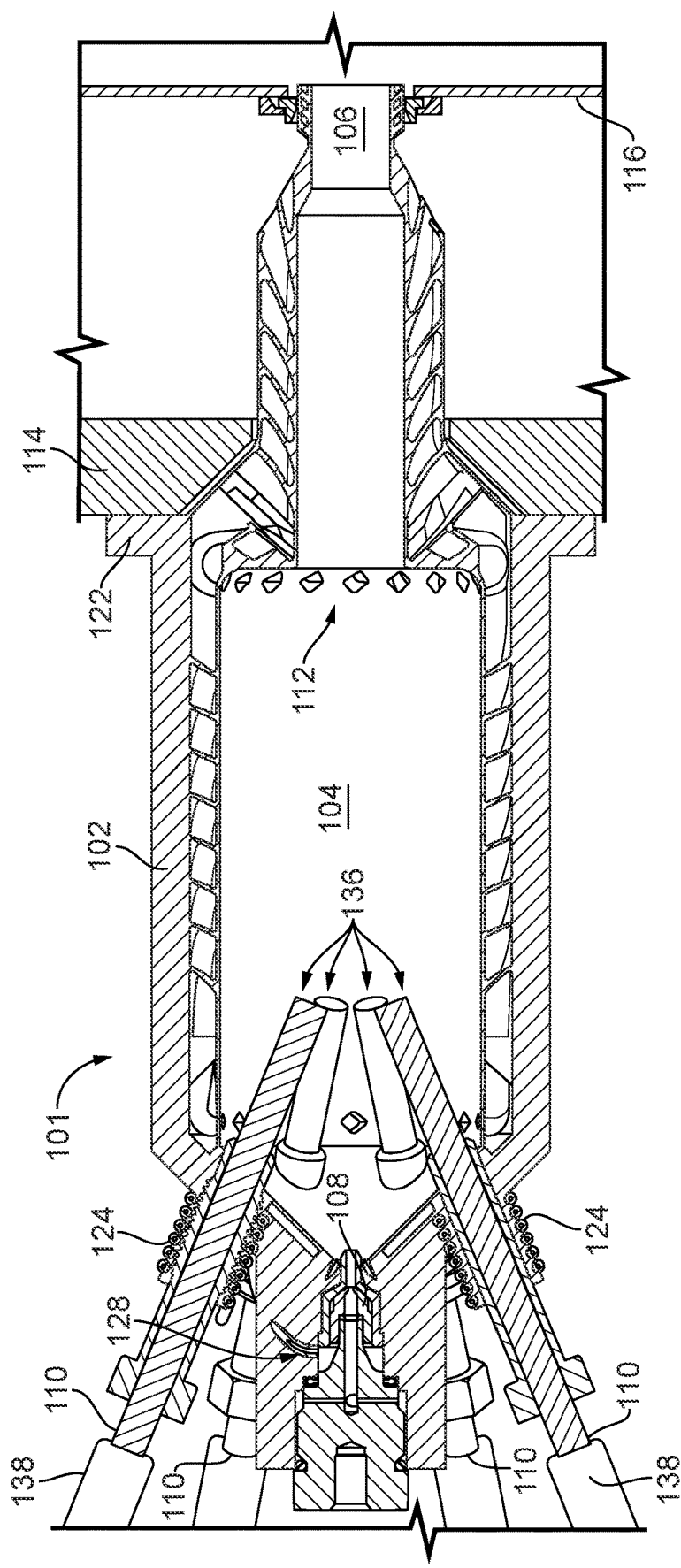
FIG. 2 is a schematic cross-sectional side elevation view of the torch ignitor of FIG. 1, showing the ignitors.

With reference now to FIG. 2, a cooling passage 124 is in thermal communication with each of the ignitors 110 for cooling the ignitors 110 with fluid, e.g. fuel, passing through the cooling passage 124. The ignitors 110 can be in a threaded interface such as shown in FIG. 2 on the top ignitor 110 such that the ignitor 110 is removable for removal or replacement. The threads provide a thermal path from the hot ignitor 110 into the cooling passage 124.

Figure 4:
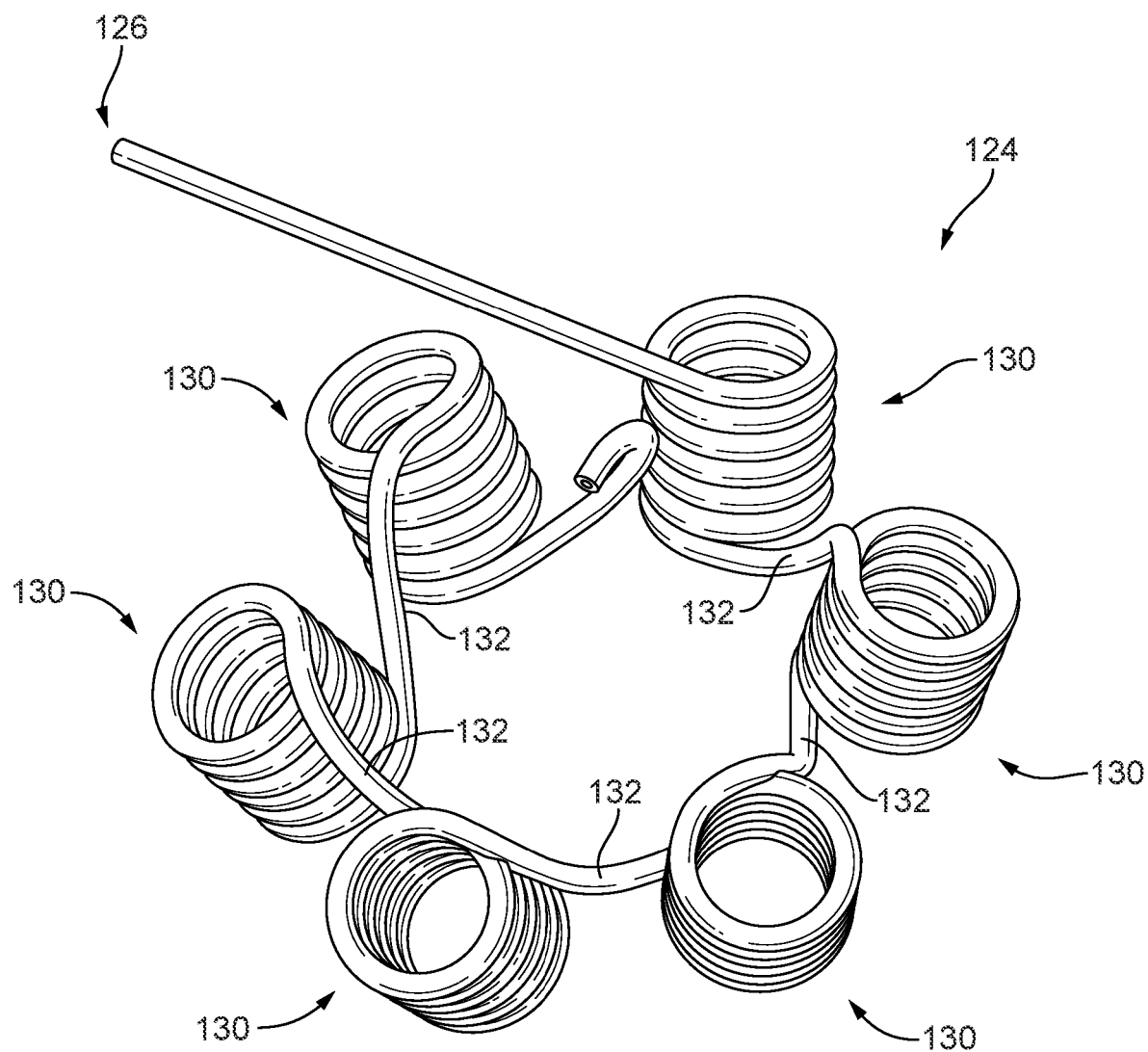
FIG. 4 is a schematic perspective view of the cooling passage of FIG. 4, showing the coil portions and the transit portions between the coil portions.
Figure 5:
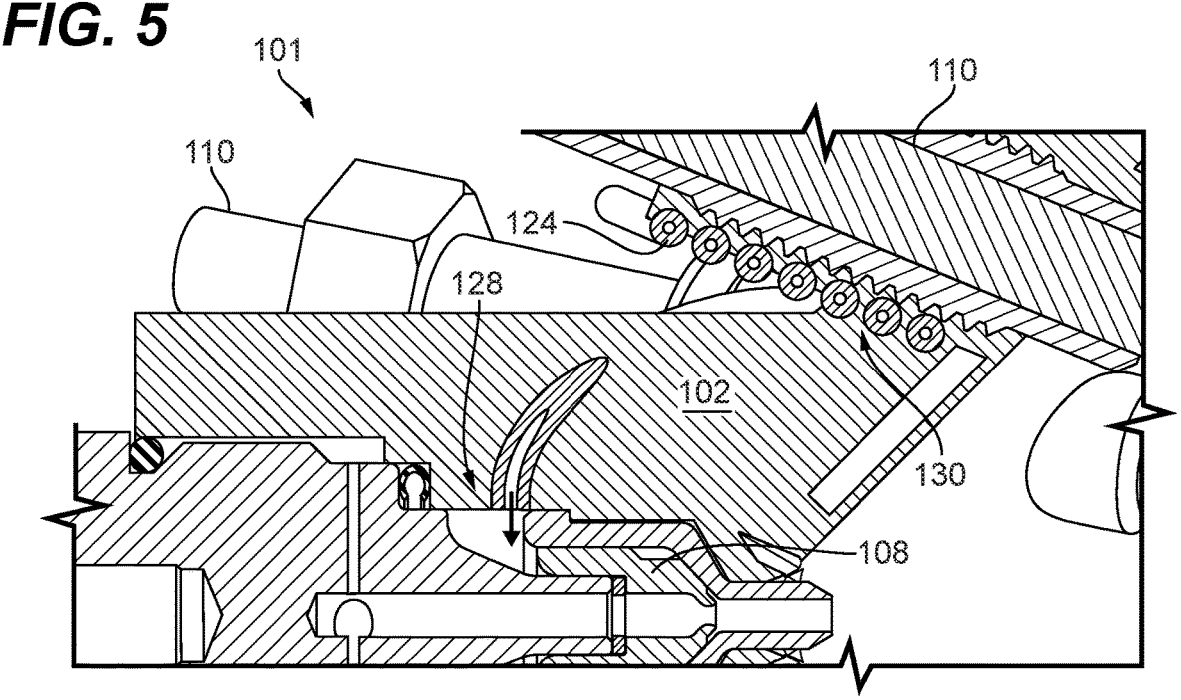
FIG. 5 is a cross-sectional side elevation view of a portion of the torch ignitor of FIG. 4, showing the outlet of the cooling passage.

The cooling passage 124 is defined between a fuel inlet 126 (labeled in FIG. 4) and a fuel outlet 128 (labeled in FIG. 5). The fuel inlet 126, shown in FIG. 4, is configured to introduce fuel from a fuel source into the cooling passage 124. The fuel outlet 128, shown in FIG. 5, is in fluid communication with the fuel nozzle 108 to supply fuel to the fuel nozzle 108 for combustion in the combustion chamber 104 of the torch ignitor 101.

Figure 3:
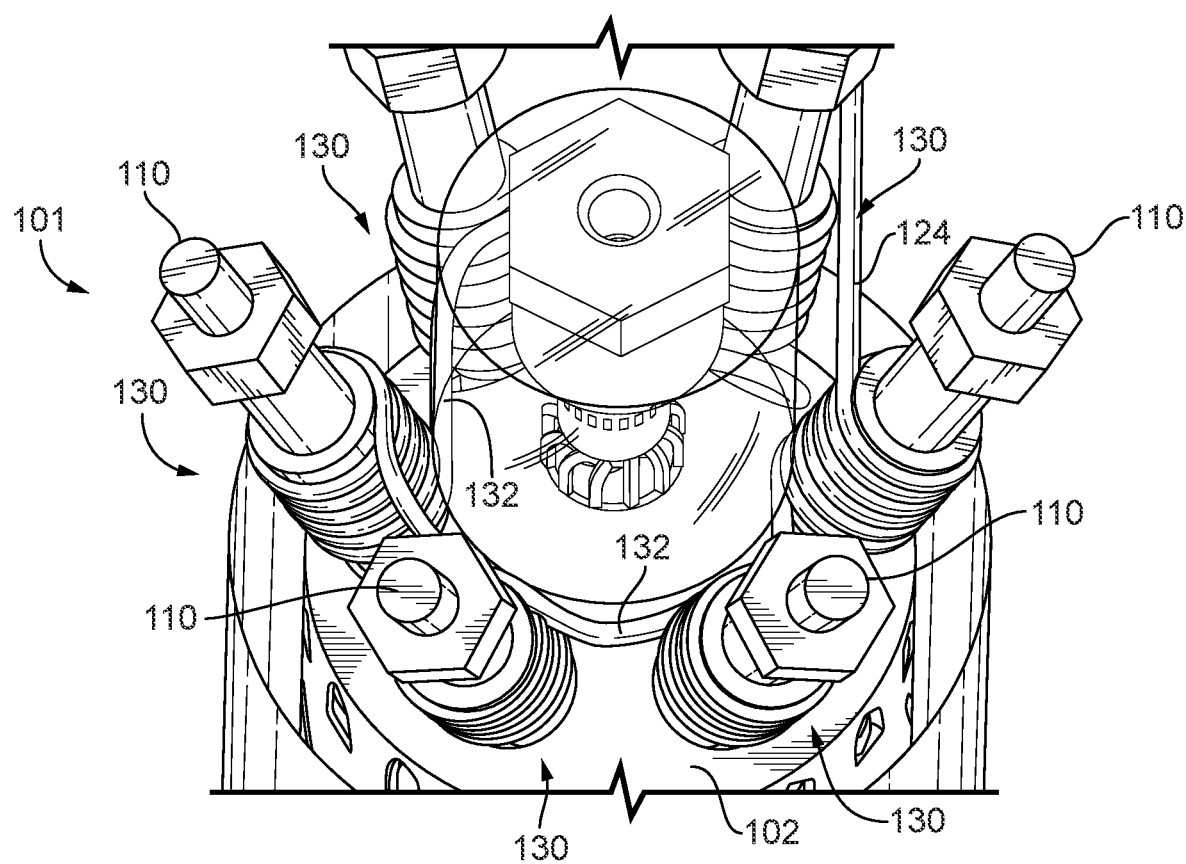
FIG. 3 is a schematic perspective view of the torch ignitor of FIG. 1, showing the cooling passage.

With reference now to FIG. 3, the cooling passage 124 includes a respective coil section 130 that is coiled along a helical path around each ignitor 110. Each ignitor 110 extends from outside the combustion chamber 104 (labeled in FIGS. 1-2), through the torch wall 102, and into the combustion chamber 104. The respective coil section 130 coils around a respective portion of each ignitor 110 that is outside the combustion chamber 104.

Referring now to FIG. 4, the coil sections 130 are connected in series with one another so the cooling passage 124 is in thermal communication with all of the ignitors 110 (as shown in FIG. 3). A respective transit portion 132 of the cooling passage 124 connects between sequentially adjacent coil sections 130. Each of the transit portions 132 extends in direction outward relative to the combustion chamber 104 (see, e.g., FIG. 2), and each of the coil sections 130 winds inward relative to the combustion chamber 104. In other words, as oriented in FIG. 4, the coils portion 130 wind from the top to the bottom, and the transit portions 132 rise from the bottom of one coil section 130 up to the top of the next. Any other suitable pattern for connecting the coil sections 130 together can also be used. For example, two tops of adjacent coil sections 130 could be directly connected, followed by two bottom ends of adjacent coil sections 130. It is also contemplated that a the coil sections 130 can be double helical such that the fuel passes from bottom to top and back to the bottom on a single ignitor 110, then passes to the next ignitor 110, and on.

With reference again to FIG. 2, within a torch igniter 101 as described herein, the tips 136 of the hot surface igniters 110 are exposed to extremely hot temperatures (e.g., 2500-4000° F., 1371-2204° C.) as they are located adjacent to or in the combustion zone of the combustion chamber 104. Even when the hot surface igniters 110 are not active, they still conduct heat along the length of each igniter 110 to the housing or torch wall 102 and electrical components outside of the system 100. The cooling passage 124 helps make the ignitors 110 durable, cooling the hot surface igniters 110 so that while the tips 136 are at temperatures that may be greater than 2500° F. (1371° C.), the main body of each ignitor 110 and especially the electrical connections 138 for each can be kept to a reasonable temperature.

This disclosure describes a way to use the fuel powering the continuous ignition torch ignitor system 100 to cool the material surrounding the hot surface igniters 110. This cooling fuel can bring down the temperature of the ignitors to a reasonable temperature that does not exceed the limitations of the materials. After it is used for cooling, the fuel continues on to be used in combustion by the torch igniter 101. The cooling passage 124 can be formed separately and joined to the torch ignitor 101, or can be additively manufactured together with the torch ignitor 101.

The methods and systems of the present disclosure, as described above and shown in the drawings, provide for cooling for ignitors in torch ignitor systems for continuous ignition function in gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A torch ignitor system comprising:
   a torch wall defining a combustion chamber therein with a flame outlet passing out of the torch wall downstream of the combustion chamber;
   a fuel nozzle mounted to the torch wall to issue fuel into the combustion chamber;
   an ignitor mounted to the torch wall, extending into the combustion chamber to ignite fuel issued from the fuel nozzle; and
   a cooling passage in thermal communication with the ignitor for cooling the ignitor with fluid passing through the cooling passage, wherein the cooling passage includes a coil section that is coiled multiple times around the ignitor along a helical path extending along the ignitor.

2. The system as recited in claim 1, wherein the cooling passage is defined between a fuel inlet and a fuel outlet, wherein the fuel inlet is configured to introduce fuel from a fuel source into the cooling passage, and wherein the fuel outlet is in fluid communication with the fuel nozzle to supply fuel to the fuel nozzle.

3. The system as recited in claim 1, further comprising an engine case, wherein the torch wall is mounted to the engine case.

4. The system as recited in claim 3, further comprising a combustor within the engine case, wherein the flame outlet is mounted in fluid communication with an interior combustion space of the combustor, wherein the combustor is spaced apart from the combustion chamber of the torch wall.

5. The system as recited in claim 4, further comprising a compressor discharge diffuser in the engine case upstream of the torch wall and combustor.

6. The system as recited in claim 5, wherein a mounting flange extends from the torch wall and is mounted to the engine case.

7. The system as recited in claim 3, wherein the torch ignitor system is in addition to a plurality of fuel injectors extending through the engine case and operatively connected to the combustor to supply fuel and air to the combustor for combustion.

8. The system as recited in claim 7, wherein the fuel nozzle and ignitor are mounted in a portion of the torch wall outside of the engine case.

9. A torch ignitor system comprising:
a torch wall defining a combustion chamber therein with a flame outlet passing out of the torch wall downstream of the combustion chamber;
a fuel nozzle mounted to the torch wall to issue fuel into the combustion chamber;
an ignitor mounted to the torch wall, extending into the combustion chamber to ignite fuel issued from the fuel nozzle; and
a cooling passage in thermal communication with the ignitor for cooling the ignitor with fluid passing through the cooling passage, wherein the cooling passage is defined between a fuel inlet and a fuel outlet, wherein the fuel inlet is configured to introduce fuel from a fuel source into the cooling passage, and wherein the fuel outlet is in fluid communication with the fuel nozzle to supply fuel to the fuel nozzle, wherein the ignitor is one of a plurality of ignitors each mounted to the torch wall, extending into the combustion chamber, wherein the cooling passage is in thermal communication with each of the ignitors in the plurality of ignitors for cooling the ignitors with fluid passing through the cooling passage.

10. The system as recited in claim 9, wherein the cooling passage includes a coil section that is coiled around the ignitor along a helical path.

11. The system as recited in claim 10, wherein the ignitor extends from outside the combustion chamber, through the torch wall, and into the combustion chamber, wherein the coil section coils around a portion of the ignitor that is outside the combustion chamber.

12. The system as recited in claim 9, wherein the cooling passage includes a respective coil section that is coiled along a helical path around each ignitor in the plurality of ignitors.

13. The system as recited in claim 12, wherein each ignitor in the plurality of ignitors extends from outside the combustion chamber, through the torch wall, and into the combustion chamber, wherein the respective coil section coils around a respective portion of each ignitor in the plurality of ignitors that is outside the combustion chamber.

14. The system as recited in claim 13, wherein the coil sections are connected in series with one another so the cooling passage is in thermal communication with all of the ignitors in the plurality of ignitors, wherein a respective transit portion of the cooling passage connects between sequentially adjacent coil sections.

15. The system as recited in claim 14, wherein each of the transit portions connect the coil sections in a pattern.

16. A torch ignitor system comprising:
a torch wall defining a combustion chamber therein with a flame outlet passing out of the torch wall downstream of the combustion chamber;
a fuel nozzle mounted to the torch wall to issue fuel into the combustion chamber;
an ignitor mounted to the torch wall, extending into the combustion chamber to ignite fuel issued from the fuel nozzle; and
a cooling passage in thermal communication with the ignitor for cooling the ignitor with fluid passing through the cooling passage, wherein the cooling passage is additively manufactured together with the torch wall.

* * * * *